(12) United States Patent
Holtmann et al.

(10) Patent No.: US 7,137,882 B2
(45) Date of Patent: Nov. 21, 2006

(54) RELEASABLE SEGMENT IN THE WORKING MEMBERS OF AN AGRICULTURAL HARVESTING MACHINE

(75) Inventors: Bernd Holtmann, Sendenhorst (DE); Martin Dammann, Harsewinkel (DE); Dirk Speckamp, Ahlen (DE)

(73) Assignee: Claas KGaA (DE)

( * ) Notice: Subject to any disclaimer, the term of this patent is extended or adjusted under 35 U.S.C. 154(b) by 0 days.

(21) Appl. No.: 10/115,919

(22) Filed: Apr. 4, 2002

(65) Prior Publication Data
US 2002/0144491 A1 Oct. 10, 2002

(30) Foreign Application Priority Data
Apr. 4, 2001 (DE) .................. 101 16 754

(51) Int. Cl.
*A01F 7/04* (2006.01)
(52) U.S. Cl. .......................... 460/75; 460/71
(58) Field of Classification Search .............. 460/46, 460/65, 66, 71, 79, 80, 81, 103, 104, 107, 460/108, 109, 110, 119
See application file for complete search history.

(56) References Cited

U.S. PATENT DOCUMENTS

| | | | | |
|---|---|---|---|---|
| 2,321,019 A | * | 6/1943 | Dray | 460/71 |
| 3,603,162 A | * | 9/1971 | Gohler | 74/16 |
| 4,255,921 A | * | 3/1981 | Kirby | 56/220 |
| 4,305,407 A | * | 12/1981 | De Coene | 460/107 |
| 4,776,155 A | * | 10/1988 | Fox et al. | 56/220 |
| 5,024,050 A | * | 6/1991 | Leidenix | 56/220 |
| 5,024,631 A | | 6/1991 | Heidjann et al. | |
| 5,254,036 A | * | 10/1993 | Johnson et al. | 460/71 |
| 5,520,253 A | * | 5/1996 | Kesting | 172/125 |
| 5,540,038 A | * | 7/1996 | Bold et al. | 56/13.1 |
| 5,613,907 A | * | 3/1997 | Harden | 460/109 |
| 5,919,087 A | * | 7/1999 | Strong et al. | 460/72 |
| 6,358,142 B1 | * | 3/2002 | Imel et al. | 460/109 |
| 6,398,639 B1 | * | 6/2002 | Dammann et al. | 460/107 |

FOREIGN PATENT DOCUMENTS

| | | |
|---|---|---|
| DE | 1 138 574 | 10/1962 |
| DE | 3529801 C1 * | 1/1987 |
| DE | 37 35 669 | 5/1989 |
| DE | 39 14 962 | 11/1990 |
| DE | 195 25 244 | 1/1997 |
| DE | 199 26 365 | 12/2000 |
| EP | 0 468 160 | 1/1992 |

* cited by examiner

*Primary Examiner*—Meredith C. Petravick
(74) *Attorney, Agent, or Firm*—Husch & Eppenberger, LLC; Robert C. Haldiman

(57) ABSTRACT

An agricultural harvesting machine includes a first rotating working member rotating about an axis; a non-rotating working member cooperatively associated with the first working member; and at least one releasable segment associated with the first rotating working member, forming an assembly and dismounting opening when the releasable segment is removed and wherein the assembly and dismounting opening creates an access to the non-rotating working member and additional adjacent working members.

18 Claims, 4 Drawing Sheets

RELEASABLE SEGMENT IN THE WORKING MEMBERS OF AN AGRICULTURAL HARVESTING MACHINE

CROSS REFERENCE TO RELATED APPLICATIONS

This application claims priority under 35 U.S.C. 119 to prior German application 101 16 754.7, filed in Germany on Apr. 4, 2001.

TECHNICAL FIELD OF THE INVENTION

The present invention relates generally to agricultural machinery and, more particularly, to a releasable segment in the working members or threshing cylinders of agricultural harvesting machine to allow improved operator access to the working members.

DESCRIPTION OF THE RELATED ART

A generic agricultural harvesting machine designed as a combine harvester is disclosed inter alia in European patent EP 0 468 160. Via a feed rake, the crop harvested in a manner not shown in more detail is fed to a threshing mechanism, which is formed by a first threshing cylinder, and a further threshing cylinder associated with this first threshing cylinder in the rear region. On the lower side, associated with the threshing cylinders are concave and separating grates, which at least partially wrap around the latter and which form a through-gap between them and the respective threshing cylinder. On account of the rotary movement of the threshing cylinders, the crop fed by the feed rake and picked up by the entraining elements of the threshing cylinders designed as beater bars is conveyed through this gap, wherein, due to the beating action of the beater bars in the region of the concave and separating grates, release of the grains from the multiple fruits and at least partial separation of these released grains are effected at the concave and separating grates.

On account of the high mechanical load during this threshing operation, in particular the concave and separating grates as well as the entraining elements of the threshing cylinders designed as beater bars are subject to elevated wear, which from time to time leads to at least the concave and separating grates having to be changed due to wear. In order moreover to be able to adapt the threshing operation to different crop species better, in agricultural machines of this kind the screen-like covers of the concave and separating grates are exchangeably connected to the respective frame of the concave and separating grates. In this way it becomes possible to adapt the openings which pass through the screen covers of the concave and separating grates better to the size of the grain crops to be separated.

In an agricultural harvesting machine designed according to EP 0 468 160, to be able to carry out exchange of the concave and separating grates or of the threshing cylinders, it is necessary to dismount at least the feed rake, so that the threshing and separating members can be taken out and reinserted through the front region of the combine harvester which was previously closed by the feed rake. Changing the threshing and separating members in this way has the drawback that conversion and assembly consumes a great amount of time.

To minimize the drawback of increased expenditure on conversion and assembly, German patent application DE 199 26 365 discloses a threshing mechanism design for a combine harvester whose concave and separating grate, which at least partially wraps around the threshing cylinder, is designed in more than one part in the axial direction of the threshing cylinder, so that the segments of the concave and separating grate can be exchanged without the feed rake which is mounted in front of the threshing mechanism having to be dismounted. In order also, in the case of a small clearance between feed rake and threshing cylinder, to be able to exchange concave and separating grate segments which produce a large angle of wrap favoring the threshing process and separation, without dismounting the feed rake, in DE 199 26 365 is also disclosed an embodiment in which the concave and separating grate is of segmented construction and each segment is formed by two partial segments which are connected to each by means of hinges.

Such a construction of the concave and separating grate makes it possible, even with a small clearance for dismounting, as is the case between feed rake and threshing mechanism, to allow dismounting of the concave and separating grate segments without the feed rake having to be removed from the combine harvester. However, this leads to structurally elaborate separating grate segments. The exchange of concave and separating grates constructed in more than one part would also be a problem if the threshing mechanism is constructed as a multi-cylinder threshing mechanism and several of the threshing cylinders are at least partially wrapped around by segmented concave and separating grates. Above all between adjacent threshing cylinders the gap is sometimes too small to be able to carry out assembly or dismounting operations on the cylinders themselves or on the associated concave and separating grates through this gap. For threshing mechanisms constructed with both a single cylinder and more than one cylinder the risk of injury to the person performing the assembly operations is high, as he or she must at least partially reach inside between separating grate and threshing cylinder.

The present invention is directed to overcoming one or more of the problems set forth above.

SUMMARY OF THE INVENTION

An aspect of the present invention is to develop the working members of an agricultural machine for picking up, processing and conveying crop in such a way that, with little structural elaborateness and without increased risk of injury to the persons performing the assembly and dismounting operations, assembly and dismounting of working members or parts thereof becomes possible.

Another aspect of the present invention is to create an assembly and dismounting opening which can be opened and closed by a releasable segment and which forms an access through which operations can be performed on adjacent working members with little structural elaborateness and low risk of injury to the assembler.

In accordance with the invention, there is provided an agricultural harvesting machine having a first rotating working member rotating about an axis; a further working member cooperatively associated with the first working member; and at least one releasable segment associated with the first rotating working member, forming an assembly and dismounting opening when the releasable segment is removed and wherein the assembly and dismounting opening creates an access to the further working member.

These aspects are merely illustrative aspects of innumerable aspects associated with present invention and should not be deemed as limiting in any manner. These and other aspects, features and advantages of the present invention will become apparent form the following detailed description when taken in conjunction with referenced drawings.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
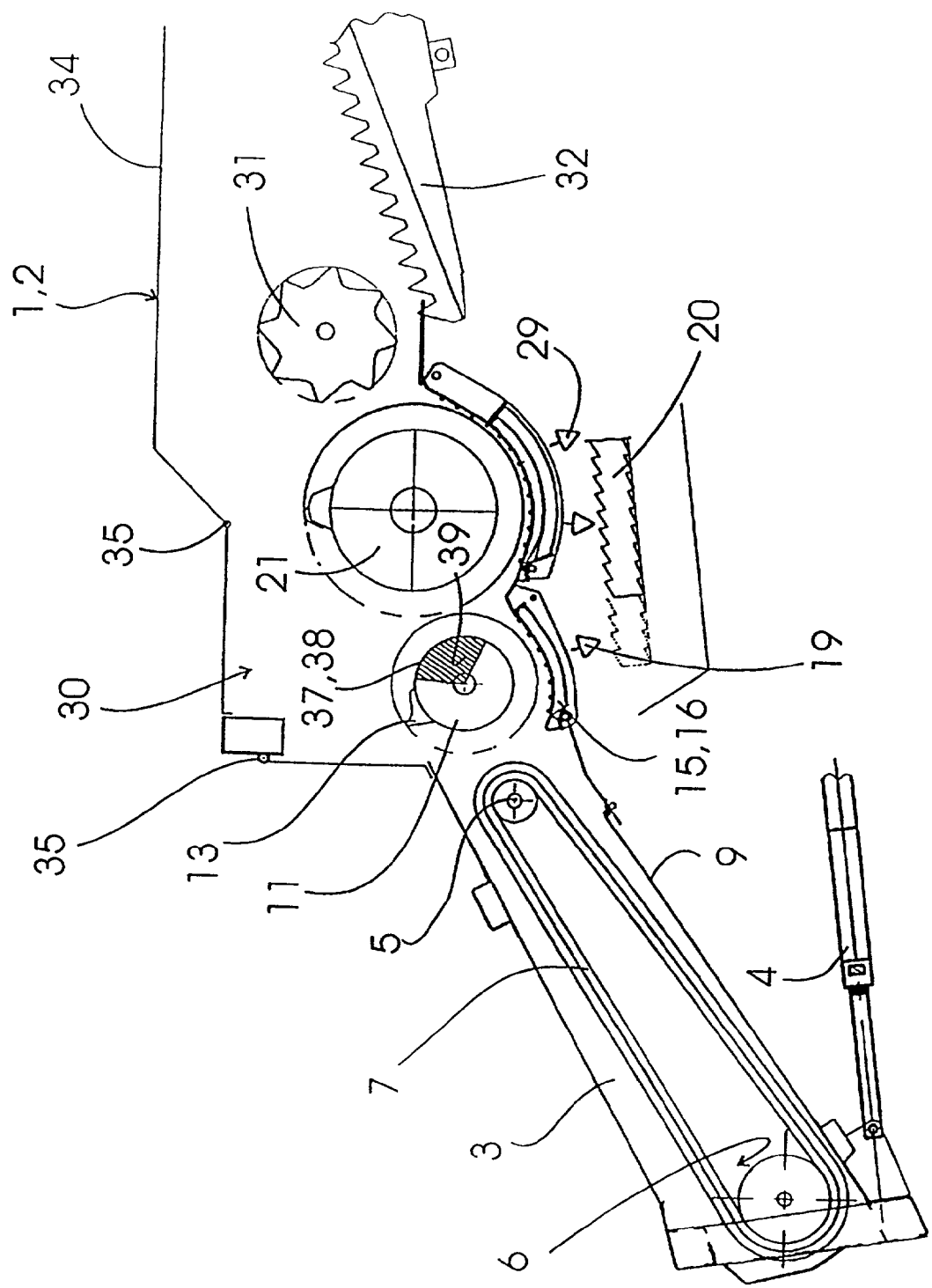
FIG. 1 is a partial schematic side view of an agricultural harvesting machine incorporating working members according to an embodiment of the present invention.
Figure 2:
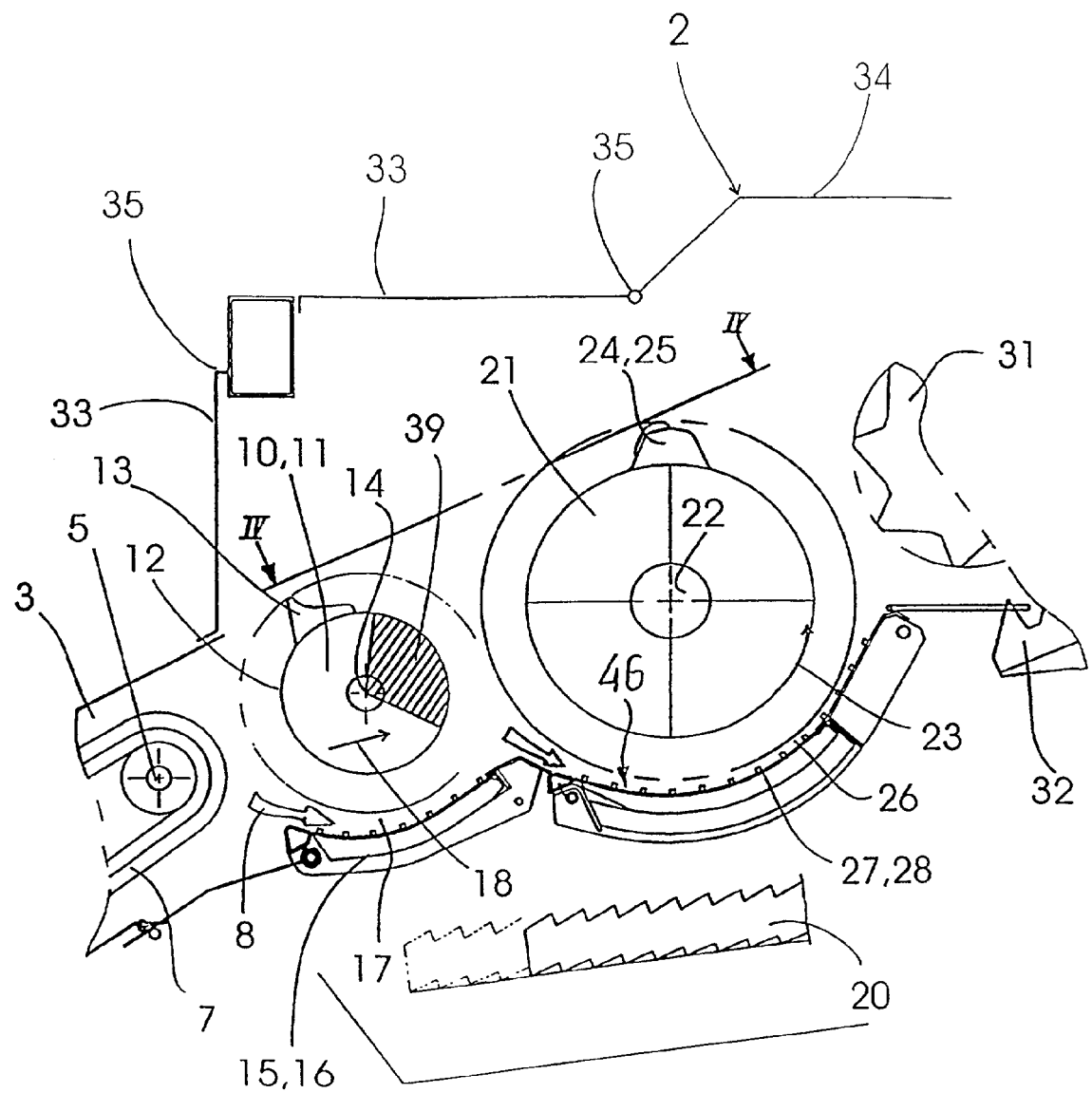
FIG. 2 is a larger schematic view side view of the working members shown in FIG. 1.

FIG. 1 shows schematically the front region of an agricultural harvesting machine 1 designed as a combine harvester 2. Associated with the combine harvester 2 for receiving a front harvesting attachment, not shown, is a feed rake 3 which is arranged on the combine harvester 2 so as to be pivotable by means of lifting cylinders 4 about an axis 5. Axis 5 extends transversely to the direction of travel FR of the combine harvester 2. In the embodiment shown, the feed rake 3 has a bottom case 9 and contains in its interior a feed mechanism 7 which is known in the art. The feed mechanism rotates in arrow direction 6 to feed the crop from the front of the feed rake to the rear region thereof. At the rear region is a working member 10 designed as a preliminary threshing cylinder 11 rotatable about a transverse axis 14. The preliminary threshing cylinder 11 includes a cylinder casing 12 which comprises any desired number of entraining elements 13 at its circumference. The entraining elements 13 can be strip-shaped or paddle-shaped in a manner known in the art and extend at least partially across the width of the preliminary threshing cylinder 11. On the lower side, the preliminary threshing cylinder 11 is at least partially surrounded by a concave and separating grate 15, which will be described in more detail. Concave 15 is variable in its position relative to the preliminary threshing cylinder and also has the function of a crop guide element 16 for the crop stream 8. The crop stream 8 picked up by the entraining elements 13 of the preliminary threshing cylinder 11 is processed by the entraining elements 13 rotating in arrow direction 18. Processing occurs in the feed gap 17 formed between preliminary threshing cylinder 11 and concave and separating grate 15, so intensively that a crop stream 19 (see FIG. 1) containing mainly grains is separated by the concave and separating grate 15 and fed to subsequent working members 20, not described in more detail. Behind the preliminary threshing cylinder 11 is mounted a further threshing cylinder 21 which can be driven in arrow direction 23 (see FIG. 2). Threshing cylinder 21 rotates about a transverse axis 22 and has beater bars 24 at its circumference. Beater bars 24 may be of any shape, number and size known in the art. The crop stream 8 emerging from the feed gap 17 in the rear region of the preliminary threshing cylinder 11 is picked up by the entraining elements 25 of the threshing cylinder 21, which are designed as beater bars 24, and fed through a further through-gap 26. Through-gap 26 is defined on the lower side likewise by a second concave and separating grate 27 which has crop guide elements 28 for the crop stream 8. The further concave and separating grate 27 is constructed so as to at least partially wrap around the threshing cylinder 21 associated with it. When the crop stream 8 is fed through the through-gap 26, processing of the crop stream 8 by beating by the beater bars 24 of the threshing cylinder 21 leads to a further crop stream 29 (see FIG. 1) containing essentially grains being separated through the concave and separating grate 27 and fed to the further working members 20. It is also possible for the threshing mechanism 30 shown, which is composed of preliminary threshing cylinder 11 and threshing cylinder 21, to include a plurality, of threshing cylinders of any shape for processing the crop stream 8. In the rear region, also associated with the threshing mechanism 30 can be a beater 31 which receives the crop stream 8 emerging from the through-gap 26 and deflects it in such a way that it can be fed without interference to a subsequent working member, for example a rack vibrator 32.

On the upper side, associated with the threshing mechanism 30 are one or more access doors 33 (see FIG. 2) which are fitted releasably between the feed rake 3 and the housing 34 of the combine harvester 2. In a manner known in the art, each of the access doors 33 can be connected by hinges 35 or by screw joints, not shown in more detail, to the housing 34 of the combine harvester 2. A combine harvester 2 designed in this way thus forms an agricultural machine 1 for picking up, processing and conveying crop 8, 19, 29 which receives a first working member 10 designed as a preliminary threshing cylinder 11 and a further working member designed as a threshing cylinder 21, wherein the two working members 11, 21 are mounted in the agricultural machine 1 so as to be rotatable about their respective axis 14, 22. The rotating working members 11, 21 on the lower side are at least partially wrapped around by further working members designed as concave and separating grates 15, 27. According to FIGS. 1 and 2, the preliminary threshing cylinder 11 has a cylindrical cylinder casing 12 with which are associated on the circumferential side the entraining elements 13 of any design.

According to the preferred embodiment of the invention, formed integrally with the cylinder casing 12 is a recess 36 (see FIG. 3) which at its simplest can be covered by a closure element 38 designed as a shell-like casing plate 37, shown in FIG. 1. The dismountable casing plate 37 forms a segment 39 releasably arranged on the preliminary threshing cylinder 11 (see the hatched area in FIGS. 1 and 2). When the casing plate 37 is dismounted, an assembly and dismounting opening 40 (see FIG. 3) on the preliminary threshing cylinder 11 forms an access 41 (see FIG. 4) through which the further working members 15, 21, 27 associated with the preliminary threshing cylinder 11 are accessible easily and with low risk of injury to the assembling person for assembly and dismounting purposes.

Figure 3:
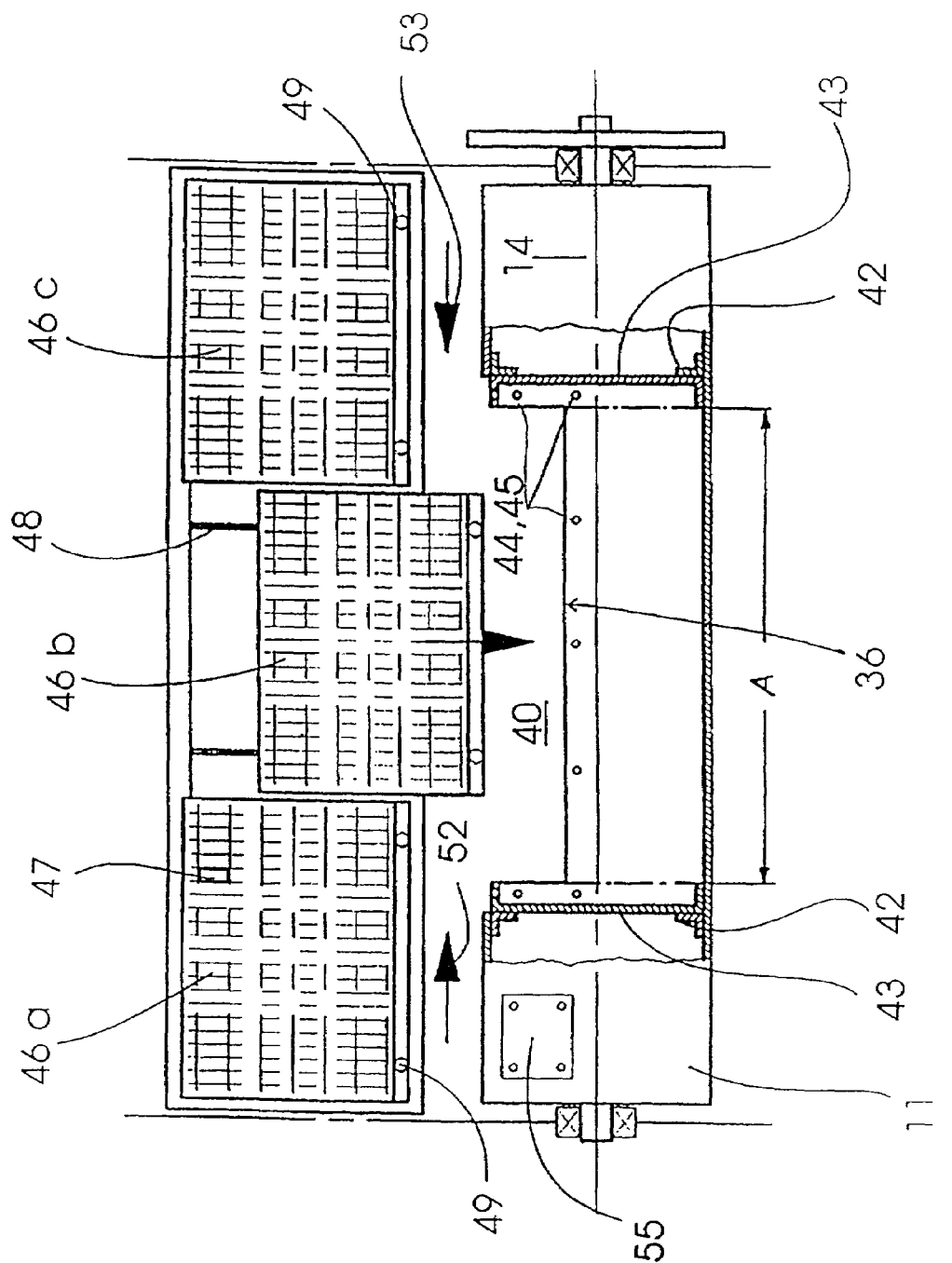
FIG. 3 is a schematic view taken along the line IV—IV in FIG. 2 with the preliminary threshing cylinder removed.
Figure 4:
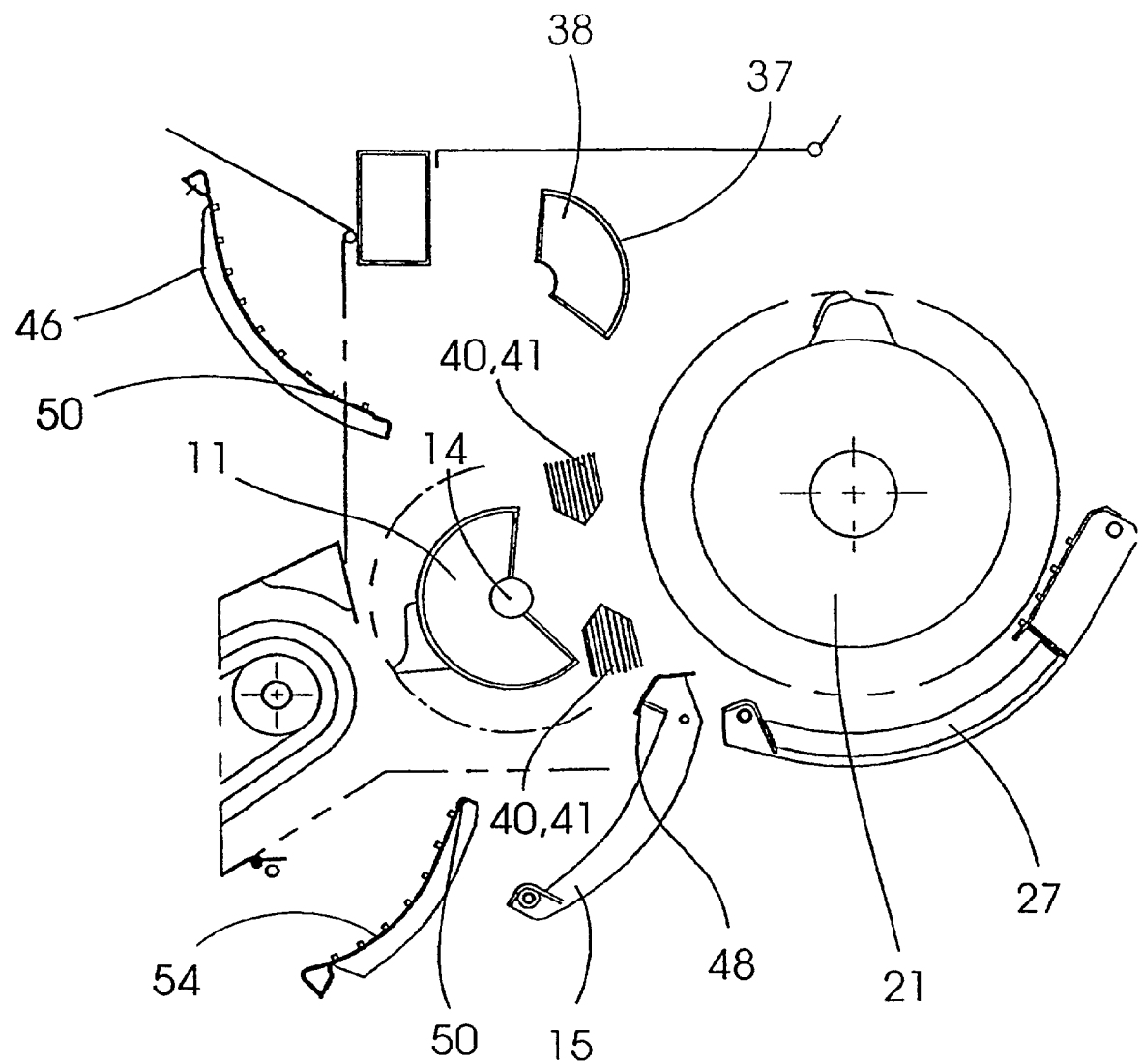
FIG. 4 is a partially exploded side view of the working members.

According to FIGS. 3 and 4, the assembly and dismounting opening 40 formed integrally with the preliminary threshing cylinder 11 extends over at least portion A of the length of the preliminary threshing cylinder 11 along the axis 14 of the preliminary threshing cylinder 11, and also over at least the length of segment 39 of the preliminary threshing cylinder 11.

In the region of the dismountable casing plate 37, at its simplest, in the preliminary threshing cylinder 11 are welded annular reinforcing webs 42 (see FIG. 3) which are operatively connected to annular fastening webs 43. Annular fastening webs 43 are also arranged in the interior of the preliminary threshing cylinder 11, so that the preliminary threshing cylinder 11 has the required rigidity in the region of the dismountable casing plate 37 and so that the casing plate 37 can easily be fastened to the cylinder casing 12 of the preliminary threshing cylinder 11. At their simplest, a plurality of threaded bores 44 pass through the fastening webs 43, so that the casing plate 37 can be screwed onto the fastening webs 43 by means of bolts 45, not shown in more detail. It is within the scope of the invention that, in addition to the reinforcing webs 42 and fastening webs 43 arranged in the transition region between cylinder casing 12 and casing plate 37, further reinforcing and fastening webs 42, 43 of this kind can be arranged in the region of the dismountable casing plate 37, which, unlike the embodiment shown, do not extend over the whole circumference of the preliminary threshing cylinder 11. Preferably, the assembly and dismounting opening 40 is to be formed in the region of the dismountable casing plate 37.

By associating a dismountable segment 39 in the form of the dismountable casing plate 37 with the preliminary threshing cylinder 11 as described, it becomes possible after removing or pivoting the access door 33 to dismount the casing plate 37 from the preliminary threshing cylinder 11, so that the access region 41 to the adjacent working members 15, 21, 27 is formed between the preliminary threshing cylinder 11 and the subsequent threshing cylinder 21. Thus it becomes possible to carry out assembly and dismounting operations in the region of the threshing mechanism 30, which considerably reduce the labor of the assembler and preclude the necessity to dismount the feed rake 3 to carry said operations.

In a manner known, the concave and separating grates 15, 27 have screen covers 46 which can be divided into individual screen cover sections 46a–c as shown in FIG. 3 or constructed in one piece, and which, depending on the crop to be harvested, must have through-openings 47 of different size, so that their exchange must be carries out depending on crop species and sometimes also wear. For exchange of the screen covers 46 to be possible at all, the screen covers 46 are inserted in the frame 48 of the respective concave and separating grate 15, 27 so as to be releasably connected to the respective frame 48 by screw joints 49 at least at one end, while at the other end at their simplest they are mounted by means of webs 50 angled in a hoe shape in slot-like openings, not shown, of the frames 48 of the concave and separating grates 15, 27. In the case of a screen cover 46 constructed in one piece, the assembly and dismounting opening 40 formed integrally with the preliminary threshing cylinder 11 should extend, in a manner not shown, over its full length. Opening 40 should be greater than the width of the one-piece screen cover 46 of the respective concave and separating grate 15, 27.

If the screen cover 46a–c is constructed in more than one piece according to FIG. 4, then the assembly and dismounting opening 40 must be at least wide enough that the widest of the screen cover sections 46a–c can be moved through the assembly and dismounting opening 40, and at least one screen cover section 46a–c in the fitted state is located completely within the width of the assembly and dismounting opening 40. In this way it is possible for all the screen cover sections 46a–c of a concave and separating grate 15, 27 to be taken out of the respective concave and separating grate 15, 27 and reinserted through the assembly and dismounting opening 40 without the feed rake 3 having to be removed.

According to FIG. 3, at least the concave and separating grate 15 of the preliminary threshing cylinder 11 can be mounted on the frame, not shown, of the agricultural harvesting machine 1 so as to be variable in its position relative to the preliminary threshing cylinder 11, so that the one-piece or multi-piece screen covers 46, 46a–c of the concave and separating grates 15, 27 of the preliminary threshing cylinder 11 and threshing cylinder 21 can be taken out of the agricultural harvesting machine 1 or inserted at different locations. To obtain the required freedom of assembly with a design of this kind too, the preliminary threshing cylinder 11 according to FIG. 3 must be rotated in such a way that on the one hand the screen cover or covers 46, 46a–c of the threshing cylinder 21 on the upper side are movable through the open access door 33 and on the other hand the screen cover or covers 46, 46a–c of the preliminary threshing cylinder 11 on the lower side in the region of the pivotable concave and separating grate 15 can be taken out of the agricultural harvesting machine 1 or introduced.

If the screen covers 46a–c according to FIG. 4 have the same width, the result is a structurally particularly simple design if the assembly and dismounting opening 40 is centrally associated with the preliminary threshing cylinder 11 and the individual screen covers 46a–c can be taken out of the concave and separating grate 27 in such a way that first the central screen cover 46b is dismounted and taken out in the direction of arrow 51 through the assembly and dismounting opening 40 and the access 41 formed by it. Then the screw joints 49 of the remaining screen covers 46a, 46c are undone and the screen covers 46a, c are successively displaced in the direction of the arrows 52, 53 into the region of the assembly and dismounting opening 40 on the frame 48 of the concave and separating grate 27, before they can be taken out through the access 41 formed by the assembly and dismounting opening 40. Installation of the screen covers 46a–c must then be carried out in the reverse order to the procedure described with respect to dismounting. On account of the concave and separating grate 15, which is variable in its position relative to the preliminary threshing cylinder 11, the one-piece or multi-piece screen cover 54 of this concave and separating grate 15 can likewise, without having to remove the feed rake 3 mounted on the front of the agricultural harvesting machine 1, be dismounted by pivoting the frame 48 of the concave and separating grate 15 into a position remote from the preliminary threshing cylinder 11. At the same time the preliminary threshing cylinder 11 is rotated into a position in which the assembly and dismounting opening 40 formed integrally with it faces towards the concave and separating grate 15, so that the access 41 according to the invention is formed between the preliminary threshing cylinder 11 and the screen cover 54 of the concave and separating grate 15 associated with the preliminary threshing cylinder 11.

To make the threshing cylinder 21, which is mounted behind the preliminary threshing cylinder 11, accessible only in a certain region through the assembly and dismounting opening 40, associated with the preliminary threshing cylinder 11 can also be several releasable segments 55 through which working members 21, 46, 48 adjacent to the preliminary threshing cylinder 11 can be reached for assembly and dismounting purposes.

It is within the scope of the invention that the segment 39 can also be formed on the threshing cylinder 21 or further working members; to obtain the effects described. In addition, several segments can be associated with a working member, so that assembly and dismounting openings are formed on this at least one rotating working member in different positions. This is of benefit if certain regions involving a high risk of injury in the case of cramped assembly and dismounting operations are to be excluded from access. Also, the invention described is not confined to the embodiment shown, but can be used on agricultural harvesting machines of any design, such as in particular on the feed and chopping members of forage harvesters, in order to obtain between the working members a through-opening which improves access to the working members.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

We claim:

1. An agricultural harvesting machine having a threshing assembly comprising:
    a threshing cylinder disposed to thresh crop, said threshing cylinder having an axis and having at least one entraining element rigidly and circumferentially mounted on said threshing cylinder;
    a complementary member disposed in cooperation with said threshing cylinder to define a feed gap therebetween;
    a single removable portion of said threshing cylinder, said removable portion being dimensioned such that, upon removal of only said single removable portion, an access gap is defined between said threshing cylinder and said complementary member, said access gap being larger than said feed gap in at least one dimension.

2. The agricultural machine of claim 1 wherein at least a portion of said complementary member is replaceable, and wherein said access gap is sufficiently large enough to allow replacement of said portion of said complementary member.

3. The apparatus of claim 1 wherein said complementary member is in segments, and said access gap is sufficiently large enough to allow replacement of any one of said segments.

4. The apparatus of claim 1 wherein said removable portion is substantially a cylinder segment.

5. An agricultural harvesting machine according to claim 1, wherein the complementary member includes a series of crop guide elements that partially surround said threshing cylinder.

6. An agricultural harvesting machine according to claim 1, further including a rotational member operatively associated with said threshing cylinder and wherein the access gap allows access to the rotational member.

7. An agricultural harvesting machine according to claim 1, wherein the releasable portion is located substantially at the longitudinal middle of the threshing cylinder.

8. An agricultural harvesting machine according to claim 1, further including at least one other releasable portion associated with the threshing cylinder.

9. An agricultural harvesting machine according to claim 1, further including reinforcing webs associated with said threshing cylinder and located between said threshing cylinder and said releasable portion.

10. An agricultural harvesting machine according to claim 1, further including fastening webs associated with said threshing cylinder and located between said threshing cylinder and the releasable portion.

11. An agricultural harvesting machine according to claim 10, wherein the releasable portion is removably connected to the fastening webs.

12. An agricultural harvesting machine according to claim 1, wherein the releasable portion is a casing plate.

13. An agricultural harvesting machine according to claim 1, wherein the complementary member includes a concave and separating grates and wherein a screen cover comprised of a plurality of screen cover sections extends along the axial direction of the complementary member.

14. An agricultural harvesting machine according to claim 13, wherein the access gap formed by the releasable portion is wider than the screen cover sections.

15. The agricultural harvesting machine according to claim 1 wherein none of said entraining elements are attached to said releasable portion.

16. The agricultural harvesting machine according to claim 1 wherein no single entraining element is attached to both the releasable portion and to a remainder of said threshing cylinder that is not the releasable portion.

17. The agricultural harvesting machine according to claim 1 wherein no entraining element need be removed in order to create said access gap.

18. The agricultural harvesting machine according to claim 1 wherein said releasable portion has an angular dimension greater than about 90 degrees.

* * * * *